Dec. 2, 1958 L. A. HERCULES 2,862,995
MOUNTING BACK FOR ELECTRICAL SWITCHING DEVICES
Filed May 11, 1953 2 Sheets-Sheet 2
FIG. 7.
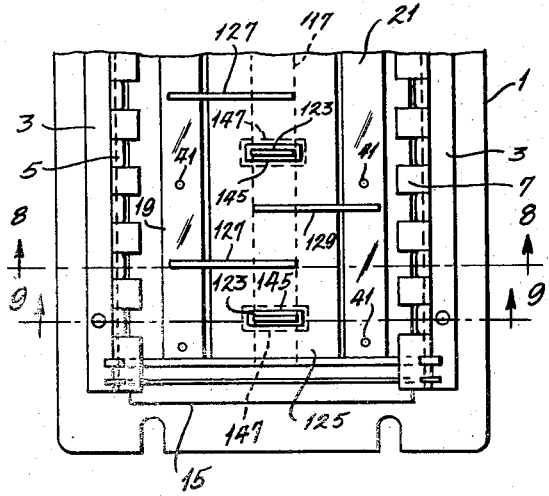
FIG. 8.
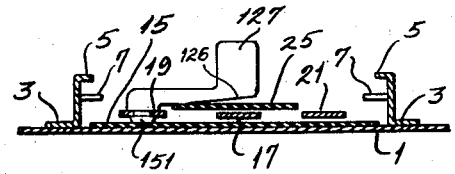
FIG. 9.
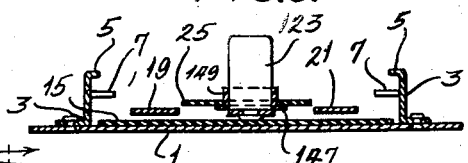
FIG. 10.
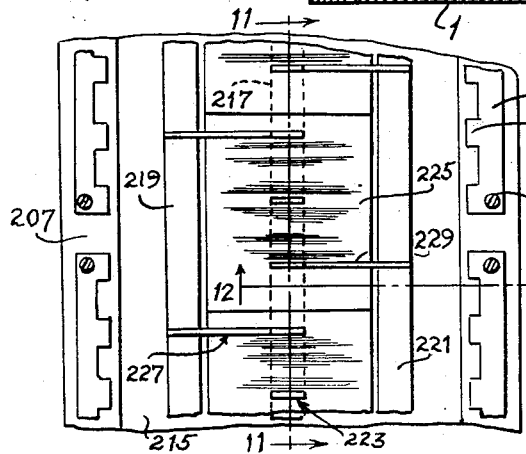
FIG. 12.
FIG. 11.
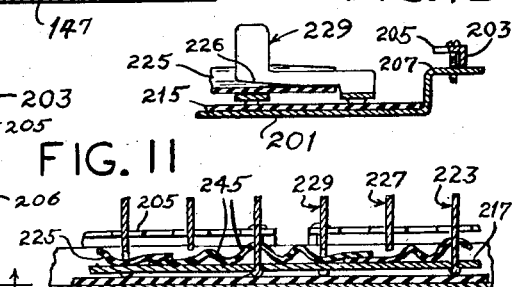
INVENTOR:
LESTER A. HERCULES,
By Bruninga and Sutherland,
ATTORNEYS.

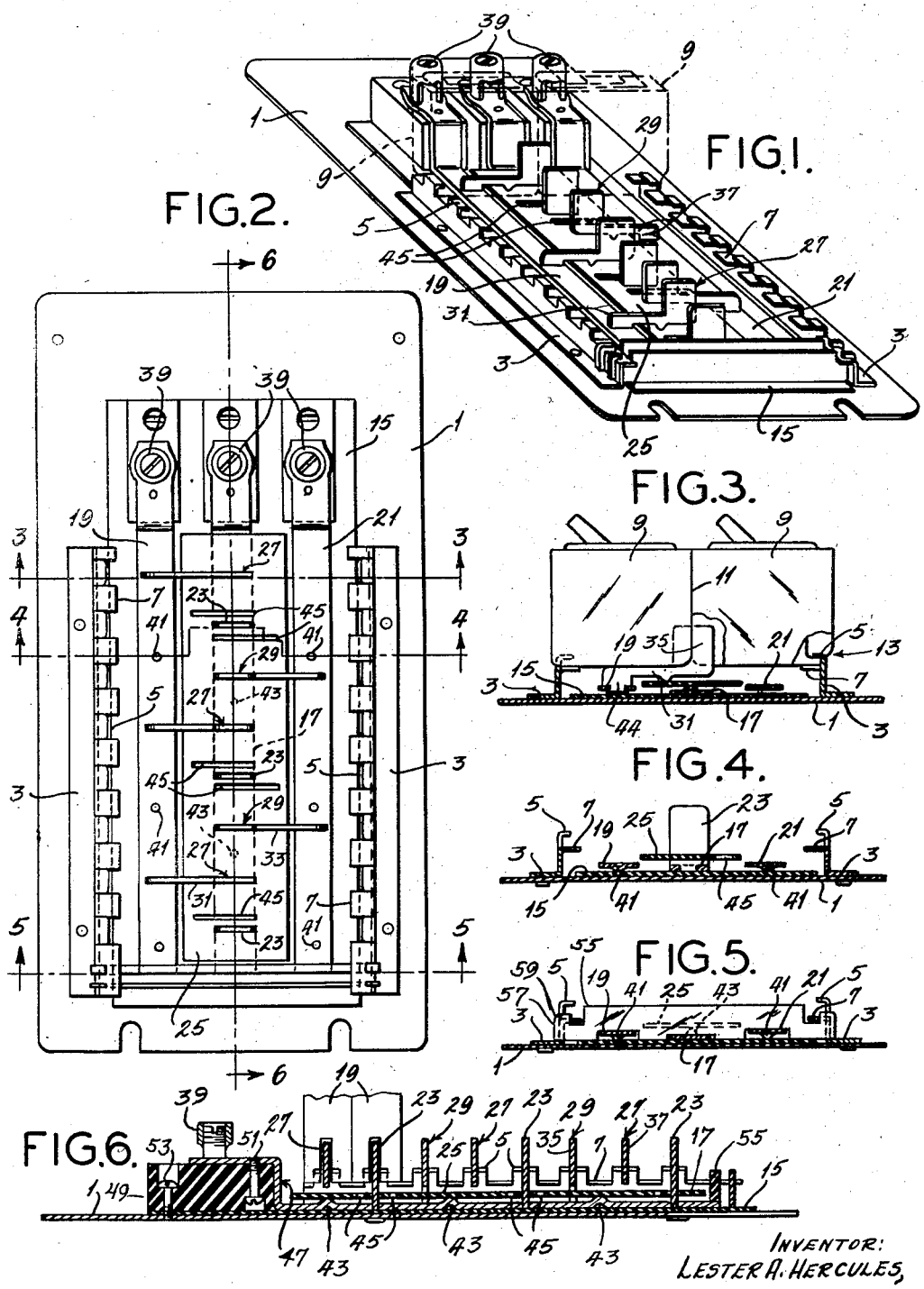

United States Patent Office 2,862,995
Patented Dec. 2, 1958

2,862,995

MOUNTING BACK FOR ELECTRICAL SWITCHING DEVICES

Lester A. Hercules, St. Louis, Mo., assignor to Frank Adam Electric Company, St. Louis, Mo., a corporation of Missouri Application May 11, 1953, Serial No. 354,054

3 Claims. (Cl. 174—99)

This invention relates to distribution panels, and more particularly to the disposition of bus bars and switching devices, such as circuit breakers, on panel boards used to control lighting and appliance branch circuits.

Customarily, the various branch circuits of a wiring system are brought together at a distribution panel for connection through individual switching or protective devices to the main supply circuit. Such panelboards commonly comprise a double row of switching devices, each of which is connected at its inner end to one of several buses and at its outer ends to a branch circuit. In a typical assembly, the switch handles are accessible from the front, the branch connections extend along the sides, and the bus bars are mounted behind the two rows of units for plug-in cooperation with the units.

One of the problems encountered in the design of such an assembly has been disposition on a mounting back of the bus bars, which should be adequately insulated from one another yet arranged compactly so that the size of the assembly is not unduly large. Heretofore, such bus bars have been embedded in a block of rubber, so that only the terminals project from the block. These terminals comprise upstanding blades arranged transversely of and spaced along the center line of the block. The bus bars extend in generally parallel coplanar relationship with one another, and they are connected to the upstanding blades by straps which lie flat with the bars and normal to the blades.

This invention represents a different solution to the problems. Among the several advantages of the invention may be noted the absence of large molded blocks of complicated configuration, the relatively small amount of space taken up by the bus bars and their insulating members, the simplicity and convenience of manufacture, and the high degree of insulation, particularly with respect to so-called surface leakage.

Briefly, the mounting back of the present invention comprises a thin sheet of insulation having a plurality of bus bars supported thereon in generally coplanar parallel relationship with one another. The terminal members are secured to the bus bars in a mortise and tenon connection, portions of the terminals being swaged over on the underneath side of the bars. These upset portions serve to space the bars from the sheet of insulation and thereby confine the electrical contact between these parts to regions of limited area more remote from each other than would otherwise be true were the bars proper to engage the sheet. The terminal members for the center bus are constituted by blades projecting straight up from the bus bar, and a second insulating member overlies this bar. The second insulating member may be of varying character, but it should terminate short of the outer bars (along at least a part of its length) in order to expose the outer bars. The terminals for the outer bars then have leg portions extending in a plane normal to that of the bar inwardly between the other blades.

In one embodiment of the invention, the second insulating member is a flat strip of insulation, formed with transverse slots extending between each terminal blade. A second embodiment uses an unslotted strip in association with rubber grommets about the blades for the center bus. Alternatively, the second insulating member may be a wavy strip forming ridges, which extend transversely between the blades. In each case, the second insulating member is a strip of insulation and current traversing the surface thereof must follow a path of greater distance than the straight-line distance between blades.

Other features of the invention will be in part apparent from and in part pointed out in the following detail description taken in connection with the accompanying drawings, in which:

Fig. 1 is an oblique view of a mounting back of this invention;

Fig. 2 is a plan view of the structure shown in Fig. 1;

Fig. 3 is a section taken on the line 3—3 of Fig. 2, with certain circuit breakers shown in position;

Fig. 4 is a transverse section taken on the line 4—4 of Fig. 2, parts being omitted for purposes of clarity;

Fig. 5 is a section taken on the line 5—5 of Fig. 2, parts being omitted;

Fig. 6 is a longitudinal section taken on the line 6—6 of Fig 2;

Fig. 7 is a partial plan view similar to that of Fig. 2 but illustrating an alternative embodiment of the invention;

Fig. 8 is a transverse section similar to that of Fig. 3, but showing the embodiment shown in Fig. 7;

Fig. 9 in a transverse section similar to that of Fig. 4, but illustrating the embodiment of Fig. 7;

Fig. 10 is a view similar to that of Fig. 7 illustrating a third embodiment of the mounting back of this invention;

Fig. 11 is a longitudinal section taken on the line 11—11 of Fig. 10; and

Fig. 12 is a transverse section taken on the line 12—12 of Fig. 10.

It may initially be noted that a typical panelboard for lighting and appliance loads comprises a double row of units (switches, fuse holders or circuit breakers) with the supply line or lines located between or behind the units for connection thereto, and with branch circuits connected to each unit outwardly of the rows. The units are generally mounted within a cabinet in such a way as to provide for convenient, safe operation by unskilled personnel, but to permit access to the circuit connections by qualified electricians. In order to simplify installation, it has become the practice to pre-mount the bus bars in insulation and provide upstanding terminals along the center line for plug-in cooperation with circuit breakers or the like.

Referring now to the drawings, Fig. 1 shows such a mounting back. The assembly comprises a sheet metal base panel 1 having a pair of upstanding flanged members 3 riveted thereto along, but spaced inwardly from, the side edges. As such, the member 3 may have two sets of inwardly projecting tongues offset and staggered with respect to one another. A first set of unit-retaining tongues 5 is formed by the flanges of the members 3, whereas a second set of unit-supporting tongues 7 is formed by inwardly upset sections of the members 3 spaced at intervals corresponding to the narrow dimensions of the switching units 9. Spacing between the two flanged members is such as to accommodate two such units abutting at their inner sides 11. In practice, the circuit breakers 9 seat at their outer sides on the unit-supporting tongues 7, and the retaining tongues 5 hook into these sides as shown at 13 in Fig. 3. The units are thereby supported in spaced relationship from the base panel 1. The space between the base and the units contains the bus bars, of which three are shown. A layer 15 of insulating material overlies the base panel 1, and the bus bars overly this layer 15. In the illustrated embodiment, a bus bar 17 extends along the center line substantially flat against the insulation 15, and the outer bus bars 19 and 21 extend parallel to but slightly above the insulation 15, between the center line and the flanged members 3. Each of these bus bars in turn has a series of upstanding terminals, which are formed with blade-like portions extending transversely of and spaced along the center line for cooperation with the circuit breakers. Terminals 23 for the central bus bar 17 project upwardly through an overlying insulating strip 25, whereas the outer bus bars 19 and 21 have elongate terminals 27 and 29, respectively, which extend over the insulating strip 25 and lie in planes perpendicular and transverse to the bus bars. These terminals 27 and 29 have leg portions 31 and 33 extending from their respective bus bars to the center line and blade-forming portions 35 and 37 substantially similar to the terminals 23. The supply lines are connected to suitable line-terminals 39 provided at the ends of the bus bars.

Because the bus bars and associated terminals should be closely spaced in order to obtain a compact structure, the provision of adequate insulation has presented certain difficulties. In speaking of insulation, it should be understood that the problem is not so much one of avoiding breakdown through the insulation as it is one of avoiding leakage running across the surface thereof.

To this end, the outer bus bars 19 and 21 are slightly separated from the insulating layer 15 by pimples 41, and the second insulating strip 25 is slightly separated from the central bar 17, as by pimples 43. Moreover, the terminals 27 and 29 have tenons 44 at their outer ends mortised in their bus bars and peened over on the back sides thereof to form slightly projecting parts, which function in the same manner as the above-mentioned pimples. The outer bars 19 and 21 are thereby supported in compact relationship, yet the surface path from the point of engagement of the outer bars and insulator is substantially lengthened. In this way, leakage across the lower insulating sheet 15 is minimized.

Leakage over the upper surface of the insulating member 25 between terminals is minimized by the provision of slots 45 which extend transversely between the terminals. These slots are offset to one or the other side of the center line, depending upon the adjacent leg of an outer terminal. As such, they too lengthen the surface path of possible leakage.

In securing the bus bars in place, an additional problem of insulation is encountered. Herein, the bars are formed with steps 47 at the ends adjacent the line terminals 39 to accommodate insulators 49. As appears from the showing of Fig. 6, a screw 51 is first threaded upwardly through each block 49 into the bus bar, and a second screw 53 is then threaded downwardly through each block into the base panel. The bus bars are thus secured to but insulated from the base panel. At their other ends, an insulating member 55 is employed to hold the bars against outward displacement. The insulating sheet 15 isolates the bars from the base panel, and member 55, which is notched to accommodate the several bus bars, is fitted over their ends. This member 55 has tongues 57 received within slots 59 in the side members 3, so as to be held thereby.

Referring now to Figs. 7 and 8, an alternative embodiment of the invention is illustrated. In general, the construction is similar to that heretofore described, but the terminals 123 for the central bus bar 117 extend through rubber grommets 145, which are received through the insulating strip 125. These grommets have rear shoulders 147 serving to maintain the insulating strip 125 spaced above the front face of the bus bar 117, and the sleeve portions 149 project substantially above the insulating strip. Also, the terminals 127 and 129 for the outer bus bars slope away from the insulating strip 125 at the inner portions 126 so that the terminals engage the strip on opposite sides. This arrangement together with the grommets serves the function of the isolating gaps heretofore described. In this instance, too, all of the bus bars are mounted slightly separated from the underlying insulating layer 115 by the rearwardly projecting portions 151 of the terminals.

In the embodiment of the invention illustrated in Figs. 9-11, the supports for the circuit breakers and the second insulating member are modified. Instead of the flat panel 1 and flanged members 3 of Fig. 1, a base panel 201 is formed with side flanges 207, which lie above the center part of the panel. These flanges in turn carry angle members 203, each of which has a plurality of inwardly projecting tongues 205. Screws 206 secure the members 203 to the panel 201. As such the parts 205 and 207 perform the same function as the tongues 5 and 7, shown in Figs. 1-6.

Insulation of the terminals is provided by strips 225 of insulation, which are corrugated so as to form ridges 245 extending transversely thereacross between terminals. It will be noted the terminal arm or leg portions 227 and 229 are received within the trough portions of the corrugations. The corrugated shape of the second insulating member serves to lengthen the surface path of leakage between terminals, in the same way as the slots 45 of Fig. 2 or the grommets 149 and bevels 126 of Fig. 8. Otherwise, the construction of the mounting back is like that described heretofore, like parts being designated by like reference characters in the two hundred series.

In use, the mounting back forms the back of a cabinet (not shown) and the supply lines are connected to the ends of the bus bars. It may here be noted that in the case of more than one bus bar, the terminals therefor are alternated along the center line so as to divide the load among the several supply lines. Also, whereas a three-bar assembly is shown, one or two bars may be omitted if desired.

The mounting back may be made up in any desired length and, in general, may have accommodation for more circuit breakers than actually required when first installed, so as to provide for future expansion. The circuit breakers are narrow, rectangular units contained within an insulated casing, and, of course, are supplied in standard size. As needed, they are connected to branch lines and mounted by first hooking the outer sides thereof under the retaining tongues 5 or 105 and swinging the inner sides inwardly onto the adjacent portions of the terminals. It is to be noted that the blade portion of any terminal is of sufficient width to accommodate two abutting units, and it will be understood that the circuit breakers have recessed clip-like terminals which receive these blade portions. The conductive frictional cooperation between the terminal and the inner sides of the circuit breakers serves to maintain the circuit breakers in position, but if desired, the front cover panel (not shown) may have a strip overlying the inner sides of the units.

From the foregoing description, it is apparent that those skilled in the art will understand the structure, function and mode of operation of the invention herein disclosed, and appreciate the advantages thereof. The invention provides a mounting back wherein the bus bars are supported in compact but adequately insulated relationship from one another and from the base panel. Moreover, the insulating members and means for holding the bus bars are relatively inexpensive strips of insulation rather than complicated molded blocks.

Although several embodiments have been disclosed in detail, it is to be understood that the invention is not limited thereto, but the drawings and description thereof are to be understood as being merely illustrative. It is realized that many modifications and variations will present themselves to those skilled in the art without departing from the spirit of this invention or the scope thereof as set forth in the appended claims.

Having thus described the invention, what is claimed and desired to be secured by Letters Patent is:

1. In a mounting back for a row of electrical plug-on devices, the improvement that comprises at least two bus bars arranged in spaced parallel generally-coplanar relationship, an apertured strip of insulating material overlying one of said bus bars, said underlying bus bar having terminal blades projecting through the apertures of said insulating strip, the edge of said insulating strip terminating outwardly of said first bus bar and short of said other bus bar, and said other bus bar having terminal arm portions extending therefrom over the insulating strip and between the terminal blades associated with said first bus bar, said terminal arm portions having upstanding blade portions aligned with the blades of said first bus bar and said terminal arm portions lying in planes perpendicular to the plane of the bus bars.

2. A mounting back as set forth in claim 1, wherein said strip of insulating material is itself corrugated with the corrugations extending transversely of the bus bars, said terminal arm portions being received with the troughs of said corrugations.

3. A mounting back as set forth in claim 1 wherein the terminal blades of the first bar and the terminal arm portions of the second bus bar at least in part project through their respective bus bars so as to form depending supporting feet for the bus bars, a sheet of insulating material extending beneath said bus bars and engaged by said supporting feet so as to hold the bus bars in spaced relationship from said sheet of insulating material.

References Cited in the file of this patent

UNITED STATES PATENTS

| | | |
|---|---|---|
| 1,542,825 | Newton | June 23, 1925 |
| 2,084,580 | Frank | June 22, 1937 |
| 2,383,926 | White | Aug. 28, 1945 |
| 2,570,229 | Hammerly | Oct. 9, 1951 |
| 2,738,444 | Casey | Mar. 13, 1956 |
| 2,738,445 | Hammerly et al. | Mar. 13, 1956 |
| 2,738,446 | Fleming | Mar. 13, 1956 |